(12) United States Patent
Michalko et al.

(10) Patent No.: US 7,710,697 B2
(45) Date of Patent: May 4, 2010

(54) HYBRID SYSTEM FOR ELECTRONICALLY RESETABLE CIRCUIT PROTECTION

(75) Inventors: Rodney G. Michalko, Queensville (CA); Brian C. Young, Etobicoke (CA)

(73) Assignee: Honeywell International Inc., Morristown, NJ (US)

( * ) Notice: Subject to any disclaimer, the term of this patent is extended or adjusted under 35 U.S.C. 154(b) by 842 days.

(21) Appl. No.: 11/253,741

(22) Filed: Oct. 20, 2005

(65) Prior Publication Data

US 2006/0087782 A1 Apr. 27, 2006

Related U.S. Application Data

(60) Provisional application No. 60/620,674, filed on Oct. 22, 2004.

(51) Int. Cl.
*H02H 3/00* (2006.01)
(52) U.S. Cl. .......................................... 361/62; 361/71
(58) Field of Classification Search .................. 361/42, 361/62–69, 71, 75
See application file for complete search history.

(56) References Cited

U.S. PATENT DOCUMENTS

| | | | |
|---|---|---|---|
| 3,122,697 A | 2/1964 | Kauders | |
| 4,360,851 A | 11/1982 | Zundel | |
| 4,467,434 A | 8/1984 | Hurley et al. | |
| 4,853,820 A | 8/1989 | Ham, Jr. et al. | |
| 4,924,342 A * | 5/1990 | Lee | 361/58 |
| 4,949,214 A * | 8/1990 | Spencer | 361/95 |
| 4,964,058 A | 10/1990 | Brown, Jr. | |
| 5,172,291 A * | 12/1992 | Bakely et al. | 361/85 |
| 5,323,307 A | 6/1994 | Wolf et al. | |
| 5,341,268 A | 8/1994 | Ishiguro et al. | |
| 5,357,394 A | 10/1994 | Piney | |
| 5,369,542 A | 11/1994 | Leone et al. | |
| 5,373,411 A | 12/1994 | Grass et al. | |
| 5,388,022 A | 2/1995 | Ahuja | |
| 5,440,441 A | 8/1995 | Ahuja | |
| 5,606,482 A | 2/1997 | Witmer | |
| 5,657,193 A * | 8/1997 | Purkayastha | 361/23 |
| 5,943,203 A | 8/1999 | Wang | |
| 6,246,928 B1 | 6/2001 | Louis et al. | |
| 6,262,871 B1 * | 7/2001 | Nemir et al. | 361/42 |
| 6,477,022 B1 * | 11/2002 | Ennis et al. | 361/42 |
| 6,577,963 B1 | 6/2003 | Cordray et al. | |
| 6,628,498 B2 | 9/2003 | Whitney et al. | |
| 6,639,775 B1 * | 10/2003 | Musiol et al. | 361/93.3 |
| 6,650,245 B2 * | 11/2003 | Chung | 340/648 |
| 6,765,776 B2 | 7/2004 | Kelwaski | |
| 6,807,035 B1 * | 10/2004 | Baldwin et al. | 361/42 |
| 6,907,321 B2 | 6/2005 | Kearney et al. | |
| 2003/0107863 A1 | 6/2003 | Kelwaski | |

(Continued)

OTHER PUBLICATIONS

High Current Power Controller, P. E. McCollum, National Aeronautics and Space Administration (NASA), Apr. 1991.

*Primary Examiner*—Danny Nguyen
(74) *Attorney, Agent, or Firm*—Oral Caglar, Esq.

(57) ABSTRACT

An electrical circuit protection system provides circuit protection in an electrical power distribution system. The electrical circuit protection system according to one embodiment comprises: an automatic reset circuit breaker; a commutation module electrically connected to the automatic reset circuit breaker; and a controller that sets a state of the commutation module based on detected state of the automatic reset circuit breaker and externally input commands.

13 Claims, 14 Drawing Sheets

U.S. PATENT DOCUMENTS

2003/0112573 A1   6/2003   Perez
2004/0228062 A1   11/2004  Kim
2005/0102043 A1   5/2005   Menas et al.
2005/0135034 A1   6/2005   Johnson et al.

* cited by examiner

HYBRID SYSTEM FOR ELECTRONICALLY RESETABLE CIRCUIT PROTECTION

CROSS REFERENCE TO RELATED APPLICATION

The present application claims priority under 35 USC §119 (e) to U.S. Provisional Application No. 60/620,674 filed Oct. 22, 2004, which is hereby incorporated by reference herein in its entirety.

BACKGROUND OF THE INVENTION

1. Field of the Invention

The present invention relates to electrical power distribution systems for vehicles, and more particularly to a circuit protection scheme for an electrical power distribution system using an electronically resetable circuit breaker arrangement.

2. Description of the Related Art

Vehicles, airborne, terrestrial or marine, that incorporate an electrical generating system to power their functions generally have a primary and a secondary electrical distribution system. The primary electrical distribution system usually handles the high wattage power produced by generator(s), and directs that power to a secondary electrical distribution system. The secondary electrical distribution system divides the incoming power among many small electrical circuits that feed individual systems and equipment on the vehicle. The secondary electrical power distribution among systems and equipment of the vehicle is typically achieved through a number of circuit breakers mounted collectively in circuit breaker panels that provide for downstream wire and circuit protection. The circuit breaker panels are within reach of the vehicle operator. Additionally, such secondary power distribution systems may also include remotely located switching devices such as relays or semiconductor devices, located in other panels or control units, and used to turn on and off loads in response to operator commands.

Traditional vehicle designs use circuit breaker panels that are physically located in the operator compartment of the vehicle. The circuit breakers are typically made of simple, low cost, highly reliable thermo-mechanically activated components that open automatically and autonomously when subjected to an overcurrent condition. Such circuit breakers are manually closed or reset, by tactile operator action. Although simple and effective, such circuit breakers add considerable weight and manufacturing cost due to their associated circuit breaker panel assembly weight. In addition, large and heavy wires and cables are needed to realize system connections between equipment bays, the operator compartment, and the location of circuit breakers and electrical loads.

Significant manufacturing cost reduction can be achieved if the secondary electrical distribution system, including the circuit breaker function, is located in close proximity to the systems and equipment of a vehicle. The cost reduction comes from decreased size of interconnecting wire gauges, smaller wire lengths, and lower installation design costs for fewer secondary power panels installed. In this case, however, the operator is remotely located from the circuit breakers during vehicle operation, and hence the operator cannot manually reset circuit breakers or deactivate circuits when needed.

However, the cost reduction mentioned above can still be achieved if the operator of the vehicle can control the circuit breaker panel function remotely. Solid-state circuits containing solid-state power controllers (SSPCs) have attempted to address this need. An SSPC is a semiconductor based switching device that typically relies upon a metal-oxide semiconductor field effect transistor (MOSFET) as the switching element. When incorporated into an Integrated Secondary Power System (ISPS), the SSPCs can provide a manner of remote switching and circuit protection through electronic communication.

SSPCs, however, have their own set of problems that tend to offset their advantages. More specifically, SSPCs are made of high cost semiconductor materials. The actual switching device in an SSPC (e.g. MOSFET) exhibits an increased "on state" resistance when compared to a circuit breaker. That increased resistance leads to increased voltage drop to downstream services and increased power dissipation, leading to increased weight and cost for additional thermal management systems. In addition, a short circuit failure mode occurs very often in SSPCs. Because the semiconductor devices used as SSPCs, such as MOSFETs, do not inherently emulate the basic function of circuit breakers, complex controllers and algorithms are needed to program the SSPCs so that their behavior mimics that of a circuit breaker. Reliability of SSPCs is lower due to the increased part count that comes with complex controllers. Reliability of SSPCs is also impacted by excessive heating and/or insufficient cooling conditions typical to vehicle environments. Therefore, while the SSPCs enable remote control, they do so at a significantly higher cost, reduced electrical performance, and low reliability.

A few publications have studied circuit protection schemes for electrical power distribution systems. One such technique is described in U.S. Pat. No. 5,440,441, entitled "Apparatus for Protecting, Monitoring, and Managing an AC/DC Electrical Line or a Telecommunication Line Using a Microprocessor." With the method described in this work, parameters of a switch are recorded by a control system, which then commands the switch to open when recorded parameters indicate an over-current condition. A controlled switch does not however emulate the basic function provided by circuit breakers. Controlled circuit breakers and switches are also used in U.S. Pat. No. 4,964,058, entitled "Power Management and Automation System."

Another technique is described in U.S. Pat. No. 6,577,963, entitled "Programmatic Resetting of Circuit Breakers." In this publication however, a priori information about components and their arrangement in the electrical power distribution system is needed to decide on a reset strategy.

Another technique is described in U.S. Pat. No. 4,853,820, entitled "Electronic Circuit Breaker Systems.". However, in the apparatus described in this work, an automatic reset circuit breaker is not used. Hence monitoring of residual currents passing through the electrical power distribution system is needed, in order to decide when it is safe to restore full electrical operating current to the electrical power distribution system.

A disclosed embodiment of the application addresses these issues by utilizing a hybrid electronically resetable circuit protection system that retains the basic function provided by circuit breakers, does not use solid state devices for circuit protection and switching functions, and can be remotely controlled.

SUMMARY OF THE INVENTION

The present invention is directed to an electrical circuit protection system that provides circuit protection in an electrical power distribution system. According to a first aspect of the present invention, the electrical circuit protection system comprises: an automatic reset circuit breaker; a commutation module electrically connected to the automatic reset circuit breaker; and a controller that sets a state of the commutation module based on detected state of the automatic reset circuit breaker and externally input commands.

According to a second aspect of the present invention, a method of providing circuit protection in an electrical power distribution system comprises: automatically detecting a state of overload current or voltage using an automatic reset circuit breaker or a current sensor; and controlling flow of current through the electrical power distribution system. The step of controlling flow of current through the electrical power distribution system includes controlling a state of a commutation module in response to a detected state of overload current or voltage, and externally input commands.

According to a third aspect of the present invention, a method of providing circuit commutation in an electrical power distribution system comprises: receiving an external command signal from an operator interface or a utility signal; and controlling flow of current through said electrical power distribution system. The step of controlling flow of current through said electrical power distribution system includes checking for previous trip states of an automatic reset circuit breaker, and controlling a state of a latching relay or switching device in response to said external command signal.

BRIEF DESCRIPTION OF THE DRAWINGS

Further aspects and advantages of the present invention will become apparent upon reading the following detailed description in conjunction with the accompanying drawings, in which.

DETAILED DESCRIPTION

Figure 1:
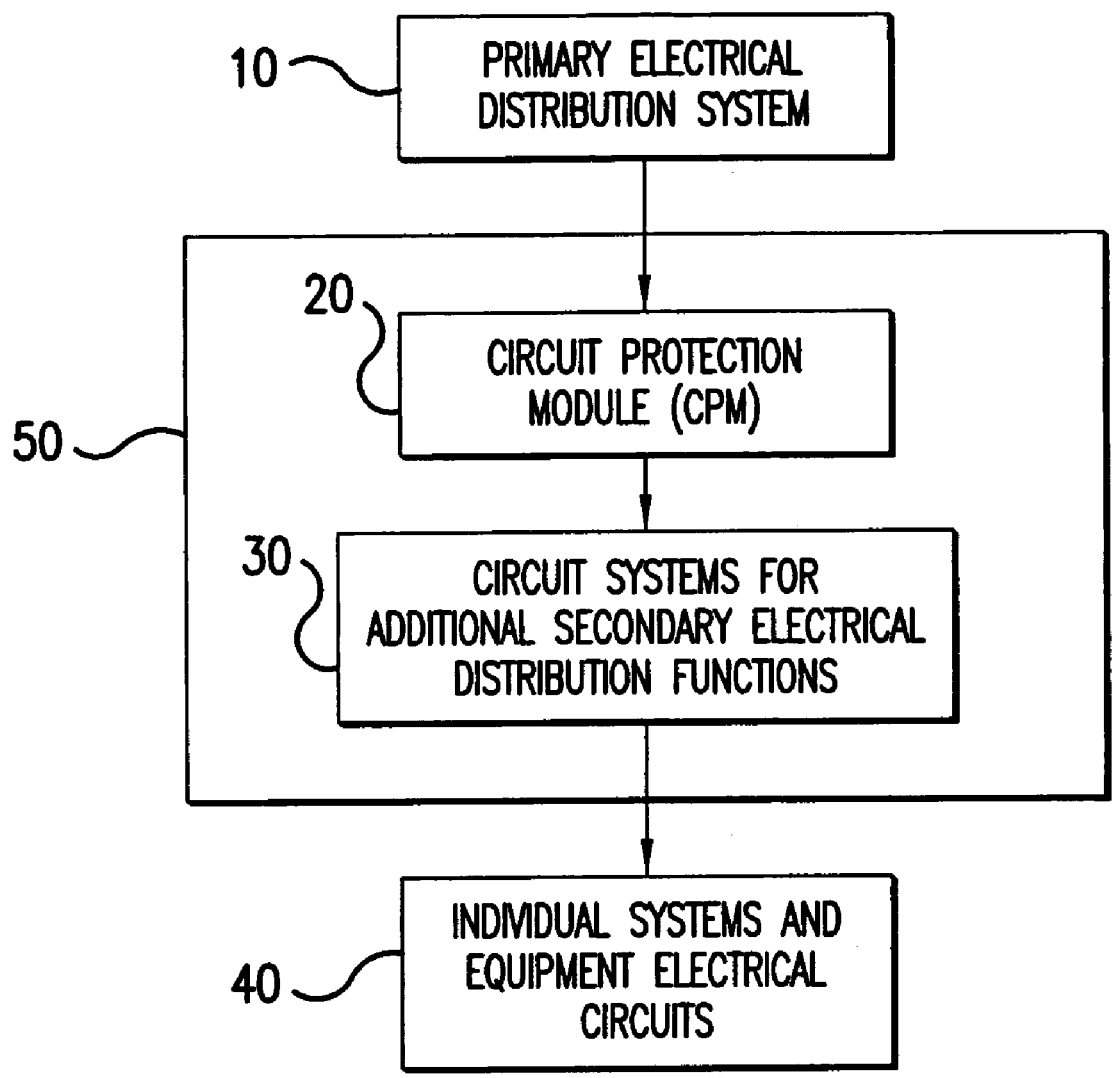
FIG. 1 is a block diagram of an electrical system of a vehicle containing a circuit protection system using an electronically resetable circuit protection arrangement according to an embodiment of the present invention.

Aspects of the invention are more specifically set forth in the accompanying description with reference to the appended figures. FIG. 1 is a block diagram of an electrical system of a vehicle containing a circuit protection system using an electronically resetable circuit protection arrangement according to an embodiment of the present invention. The electrical system 100 illustrated in FIG. 1 includes the following components: a primary electrical distribution system 10; a circuit protection module (CPM) 20 for electronically resetable circuit protection 20; circuit systems for additional secondary electrical distribution functions 30; and individual systems and equipment electrical circuits 40. The CPM 20 and circuit systems for additional secondary electrical distribution functions 30 form an integrated secondary power system (ISPS) 50 of a vehicle. Operation of the system 100 in FIG. 1 will become apparent from the following discussion.

The primary electrical distribution system 10 handles high wattage power from multiple sources. The high wattage power can be as much as 250 KVA per source. Individual channel currents in primary electrical distribution system 10 can be as much as 300 Amps per phase, in one exemplary implementation. The primary electrical distribution system 10 may be a generator of a vehicle. The high wattage power from the primary electrical distribution system 10 reaches CPM 20. CPM 20 distributes a portion of the high wattage power received within the ISPS 50 and protects the individual systems and equipment electrical circuits 40. The circuit systems for additional secondary electrical distribution functions 30 may incorporate any electrical components that divide and adjust high power and currents to lower power and current levels. The circuit systems for additional secondary electrical distribution functions 30 may include electrical transformers, electrical dividers, transistor circuits, etc. The individual systems and equipment electrical circuits 40 are circuits that enable functioning of all services onboard a vehicle. Such services may be an electric motor, an automatic braking system, an electrical light that can be turned on inside the vehicle, etc.

Figure 2:
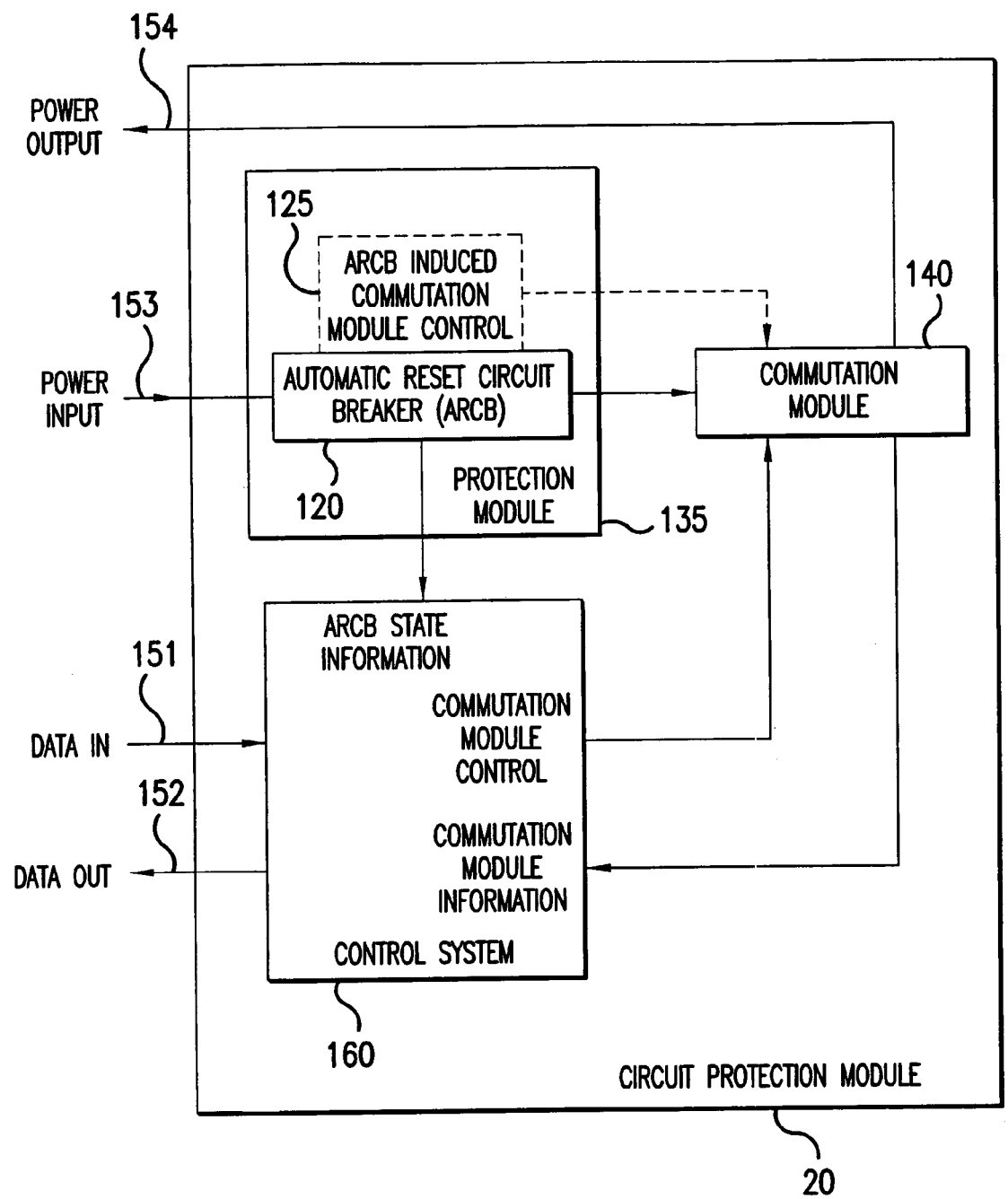
FIG. 2 illustrates a single circuit protection module that may be included in a circuit protection system using an electronically resetable circuit protection arrangement according to an embodiment of the present invention illustrated in FIG. 1.

FIG. 2 illustrates a single CPM 20 that may be included in a circuit protection system ISPS 50 using an electronically resetable circuit protection arrangement according to an embodiment of the present invention illustrated in FIG. 1. The CPM 20 includes the following components: a protection module 135; a commutation module 140; and a control system 160. The protection module 135 includes an automatic reset circuit breaker (ARCB) 120. The commutation module 140 includes a semiconductor or electromechanical system with predetermined levels of power and current output and remotely controlled on/off states. The control system 160 receives mechanical and/or electrical information relating to ARCB 120 and commutation module 140, such as information about the state of the ARCB 120, the position/state of commutation module 140, and the current passing through commutation module 140. The control system 160 controls electrical and mechanical characteristics of commutation module 140, such as the position/state of commutation module 140, in response to "on-off" commands included in the "data in" input 151 for the particular service that control system 160 controls. Protection module 135 may include an ARCB induced commutation module control 125, which controls electrical and/or mechanical characteristics of commutation module 140.

Control system 160 may be a Module Control Device that receives commands and transmits data to external components; a system composed of individual elements distributed on different cards within a single distribution panel or located in separate panels or locations on the vehicle forming a virtual system through interconnecting data buses and discrete wiring; a system incorporated in a centralized vehicle management computer; or a microprocessor-based controller linked to an appropriate number of commutation module and switching device drivers and analog/digital circuits to manage system input/outputs. The above list with implementation examples for control system 160 is not exhaustive. A control system 160 that is a microprocessor-based controller can use an analog device, a digital device such as a field programmable gate array or an application specific integrated circuit to perform control functions. The basic logic of control system 160 may be implemented in hardware, software, or any combination of these methods and other implementation methods.

Figure 3:
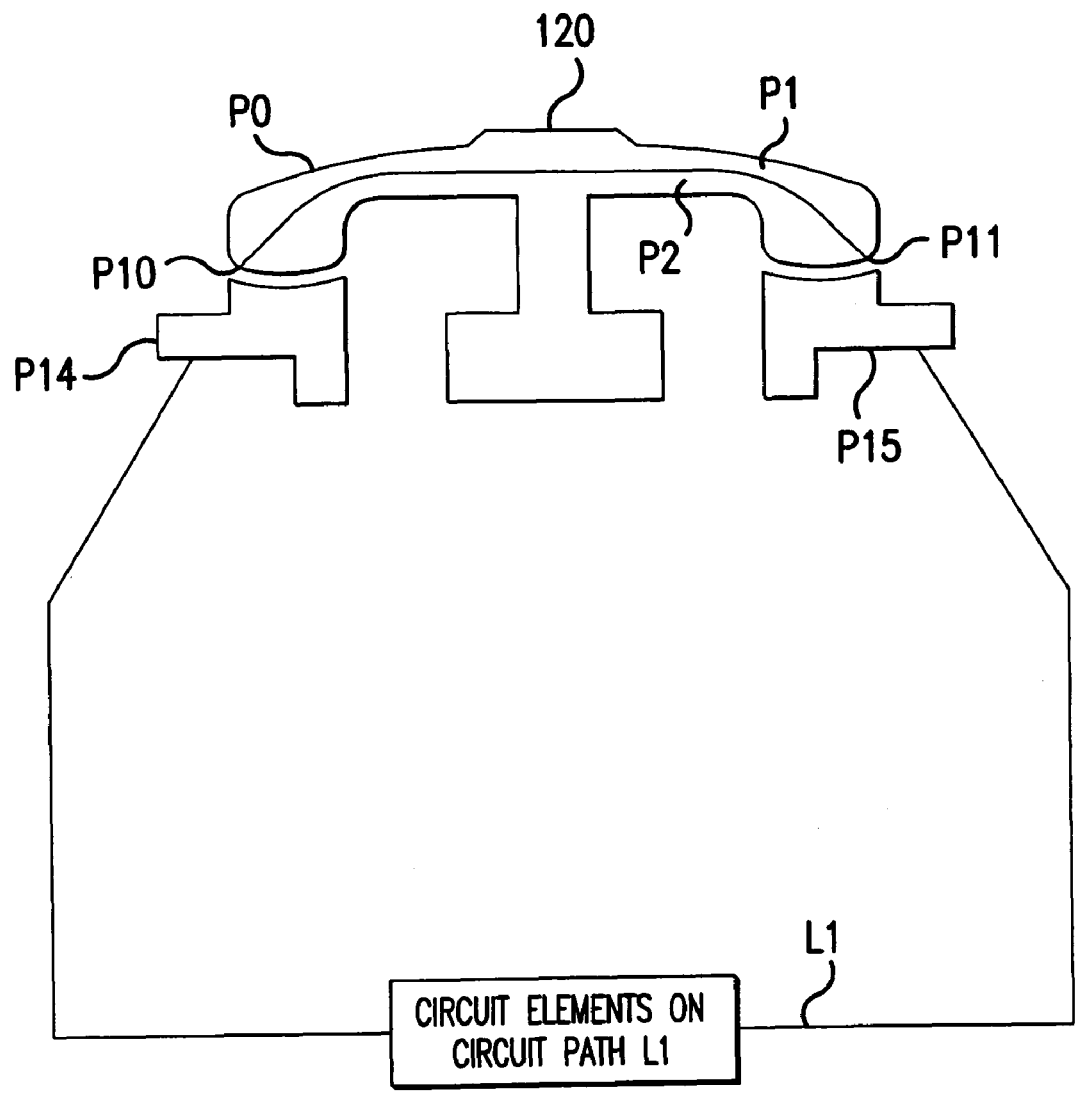
FIG. 3 illustrates an exemplary automatic reset circuit breaker included in a circuit protection module with electronically resetable circuit protection according to an embodiment of the present invention illustrated in FIG. 2.

FIG. 3 illustrates an exemplary ARCB 120 included in a CPM 20 with electronically resetable circuit protection according to an embodiment of the present invention illustrated in FIG. 2. An ARCB 120 contains a bimetal strip P0 made of two metals P1 and P2 bonded together. Metals P1 and P2 have different thermal expansion rates. Metal P1 has a low thermal expansion rate and metal P2 had a high thermal expansion rate. Commonly used metals P1 and P2 are steel and copper. The ends of bimetal strip P0 form the ARCB contacts P10 and P11. ARCB contacts P10 and P11 open and close a circuit L1 inside CPM 20 at circuit contacts P14 and P15.

Figure 4A:
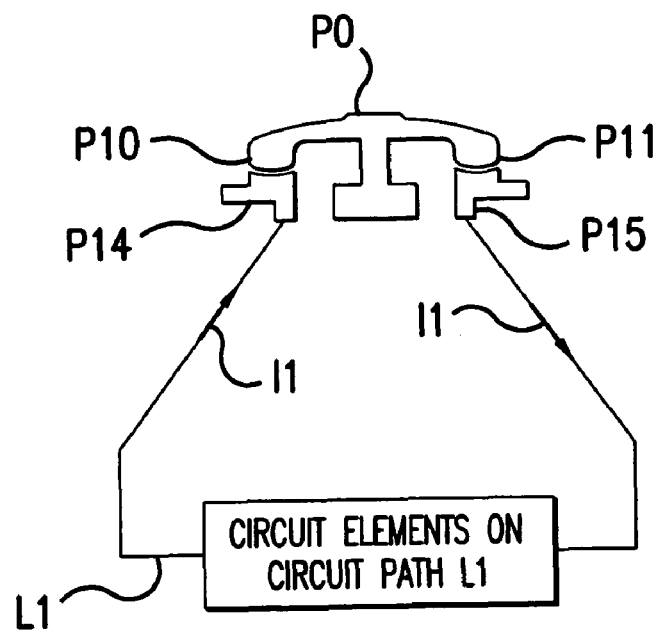
FIG. 4A-FIG. 4B illustrate aspects of the operation of an exemplary automatic reset circuit breaker included in a circuit protection module with electronically resetable circuit protection according to an embodiment of the present invention illustrated in FIG. 2.
Figure 4B:
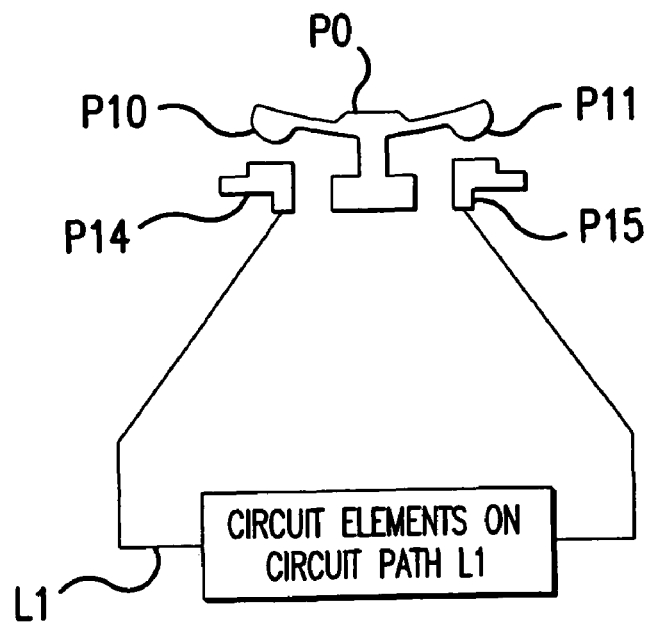

FIG. 4A-FIG. 4B illustrate aspects of the operation of an exemplary ARCB 120 included in a CPM 20 with electronically resetable circuit protection according to an embodiment of the present invention illustrated in FIG. 2. In FIG. 4A, a current I1 below the current rating of ARCB 120 passes through ARCB 120 and circuit L1. Conductive bimetal strip P0 of ARCB 120 keeps ARCB contact P10 in touch with circuit contact P14, and ARCB contact P11 in touch with circuit contact P15. If current I1 becomes higher than the current rating of ARCB 120, a current overload occurs. Excessive heat from overload current I1 expands bimetal strip P0. Metals P1 and P2 in bimetal strip P0 change shape unevenly due to their different thermal expansion rates. As a result, bimetal strip P0 bends upward snapping into reverse position as shown in FIG. 4B, and ARCB contacts P10 and P11 move away from circuit contacts P14 and P15, thereby interrupting current flow in circuit L1. With no current flowing, bimetal strip P0 cools and automatically returns to its normal shape from FIG. 4A. As bimetal strip P0 springs back, ARCB contact P10 touches circuit contact P14, and ARCB contact P11 touches circuit contact P15, thereby reclosing circuit L1. An ARCB 120 operating as described is similar to a manual circuit breaker. ARCB 120 is not latched. Once the current overload has been removed and ARCB 120 has reclosed circuit path L1, CPM 20 can be reset.

Figure 5A:
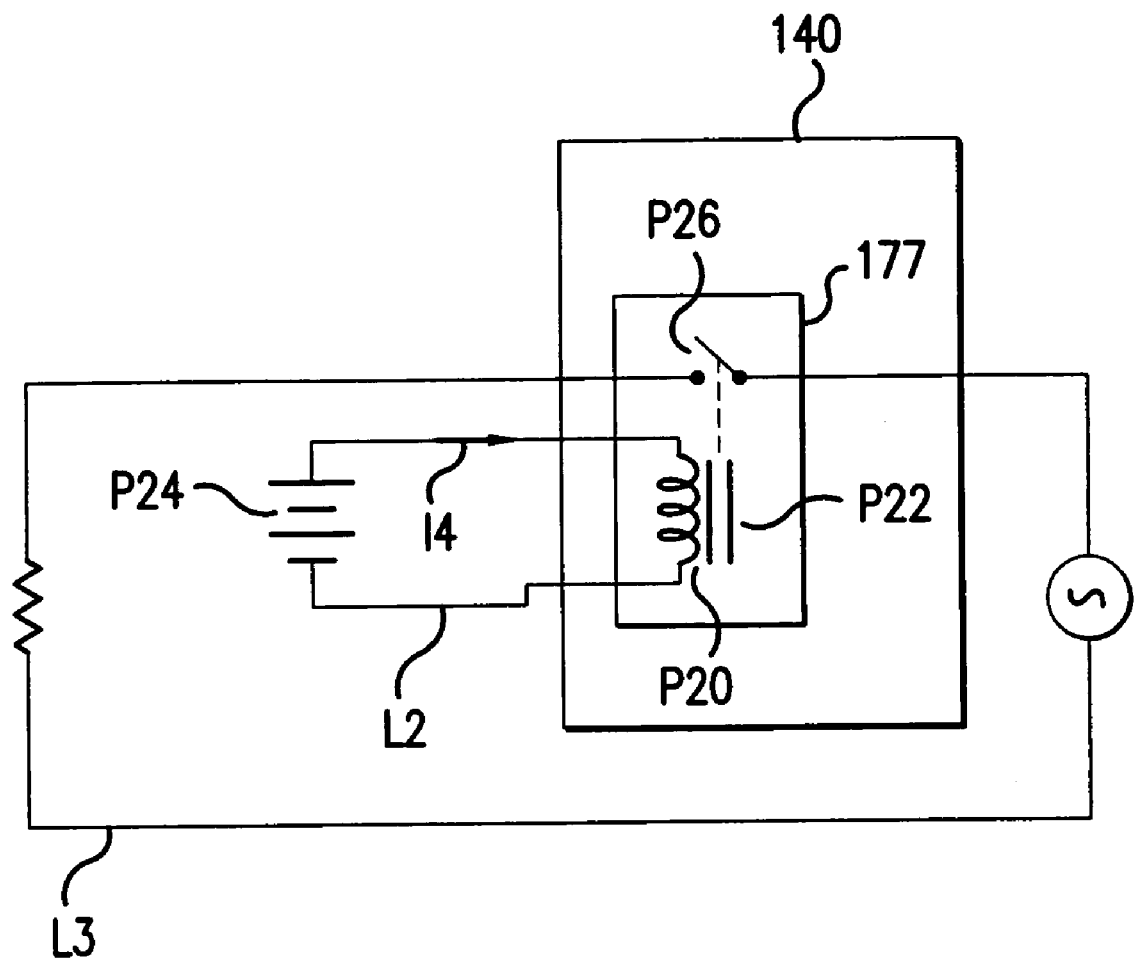
FIG. 5A illustrates an exemplary switch device included in a commutation module of a circuit protection module with electronically resetable circuit protection according to an embodiment of the present invention illustrated in FIG. 2.

FIG. 5A illustrates an exemplary switch device 177 included in a commutation module 140 of a CPM 20 with electronically resetable circuit protection according to an embodiment of the present invention illustrated in FIG. 2. The switch device 177 illustrated in FIG. 5A is an electromechanical relay. In other embodiments of this invention, switch device 177 may be any semiconductor device such as a MOSFET, SCR or TRIAC among others, provided that the higher voltage drop of the switch device 177 is not a concern for CPM 20. The electromechanical relay switch device 177 in FIG. 5A contains a relay coil or solenoid P20 and a switch P26. Switch P26 is made of conductive metallic materials. Switch P26 is mechanically arranged to respond to a force exerted by a generated magnetic field. The relay coil P20 is energized by voltage P24 in circuit L2. Current I4 flowing through relay coil P20 produces magnetic field P22 oriented along length of coil P20. Magnetic field P22 exercises a magnetic force thereby closing switch P26 and establishing current flow in circuit L3. If voltage P24 is brought down to zero, current I4 and magnetic field P22 become zero, thereby opening switch P26 and circuit L3.

Figure 5B:
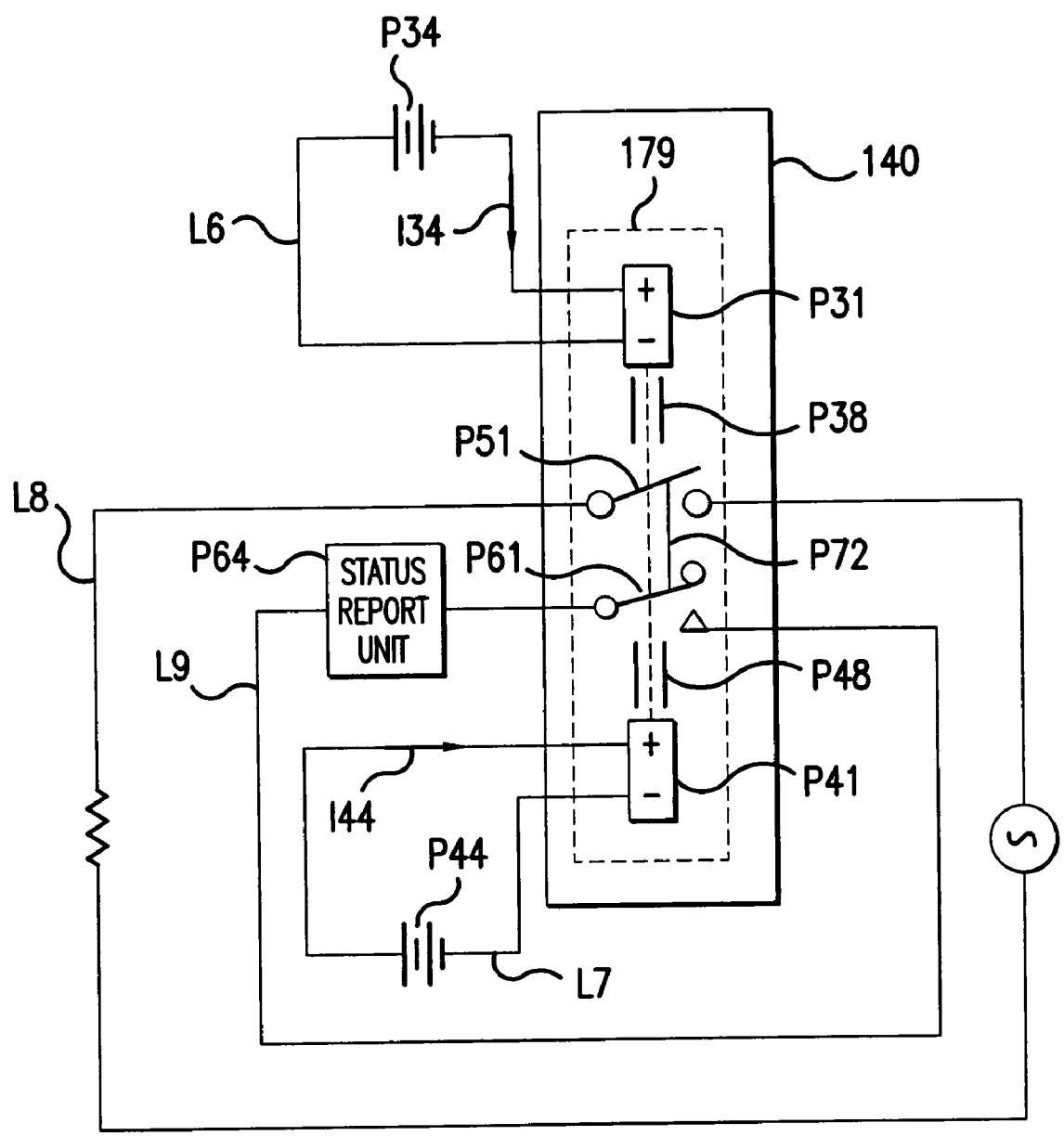
FIG. 5B illustrates an exemplary commutation device included in a commutation module of a circuit protection module with electronically resetable circuit protection according to an embodiment of the present invention illustrated in FIG. 2.

FIG. 5B illustrates an exemplary commutation device 179 included in a commutation module 140 of a CPM 20 with electronically resetable circuit protection according to an embodiment of the present invention illustrated in FIG. 2. The commutation device 179 illustrated in FIG. 5B is a latching relay that includes: two solenoids P31 and P41; a main contact P51; and status contact P61.

Main contact P51 and status contact P61 are made of conductive metallic materials. Main contact P51 determines the overall state of latching relay 179 by opening or closing circuit L8. Status contact P61 opens or closes circuit L9. Status contact P61 is physically linked to the actuation shaft of the main contact P51 by mechanical link P72. Thus when main contact P51 lifts up and opens circuit L8, status contact P61 also lifts up and opens circuit L9. Similarly, when main contact P51 lowers and closes circuit L8, status contact P61 also lowers and closes circuit L9. Therefore the status (open/closed) of main contact P51 is identical to the status of status contact P61. Circuit L9 includes a status report unit P64 that records the status of status contact P61. Status report unit P64 may detect status of contact P61 based on current or potential difference in circuit L9.

Main contact P51 is mechanically arranged to respond to a force exerted by a generated magnetic field. Solenoid P31 is energized by voltage P34 and current I34 in circuit L6. Current I34 flowing through solenoid P31 produces magnetic field P38 oriented along the length of solenoid P31. Magnetic field P38 exercises a magnetic force on main contact P51, thereby opening main contact P51 and stopping current flow in circuit L8. Similarly, solenoid P41 is energized by voltage P44 and current I44 in circuit L7. Current I44 flowing through solenoid P41 produces magnetic field P48 oriented along the length of solenoid P41. Magnetic field P48 has a direction opposite to magnetic field P38. Magnetic field P48 exercises a magnetic force on main contact P51, thereby closing main contact P51 and establishing current flow in circuit L8. If only one of the solenoids P31 and P41 is energized and hence only one of the magnetic fields P38 and P48 is present, the status of main contact P51 is determined solely by the present magnetic field. If both solenoids P31 and P41 are energized and hence both magnetic fields P38 and P48 are present, the status of main contact P51 is determined by the stronger magnetic field between P38 and P48. If voltages P34 and P44 are brought down to zero, currents I34 and I44, and magnetic fields P38 and P48 become zero. Since main contact P51 contains no mechanical actuators such as mechanical springs, it retains the last state it had before voltages P34 and P44 were brought down to zero. Hence, the latching relay 179 requires electrical power only when a change of its state is required. No electrical power is needed or dissipated to maintain the normally on and off states of latching relay 179. Latching relay 179 can therefore reduce the power dissipation of CPM 20 and provide greater autonomy of operation for circuit protection functions.

Figure 6:
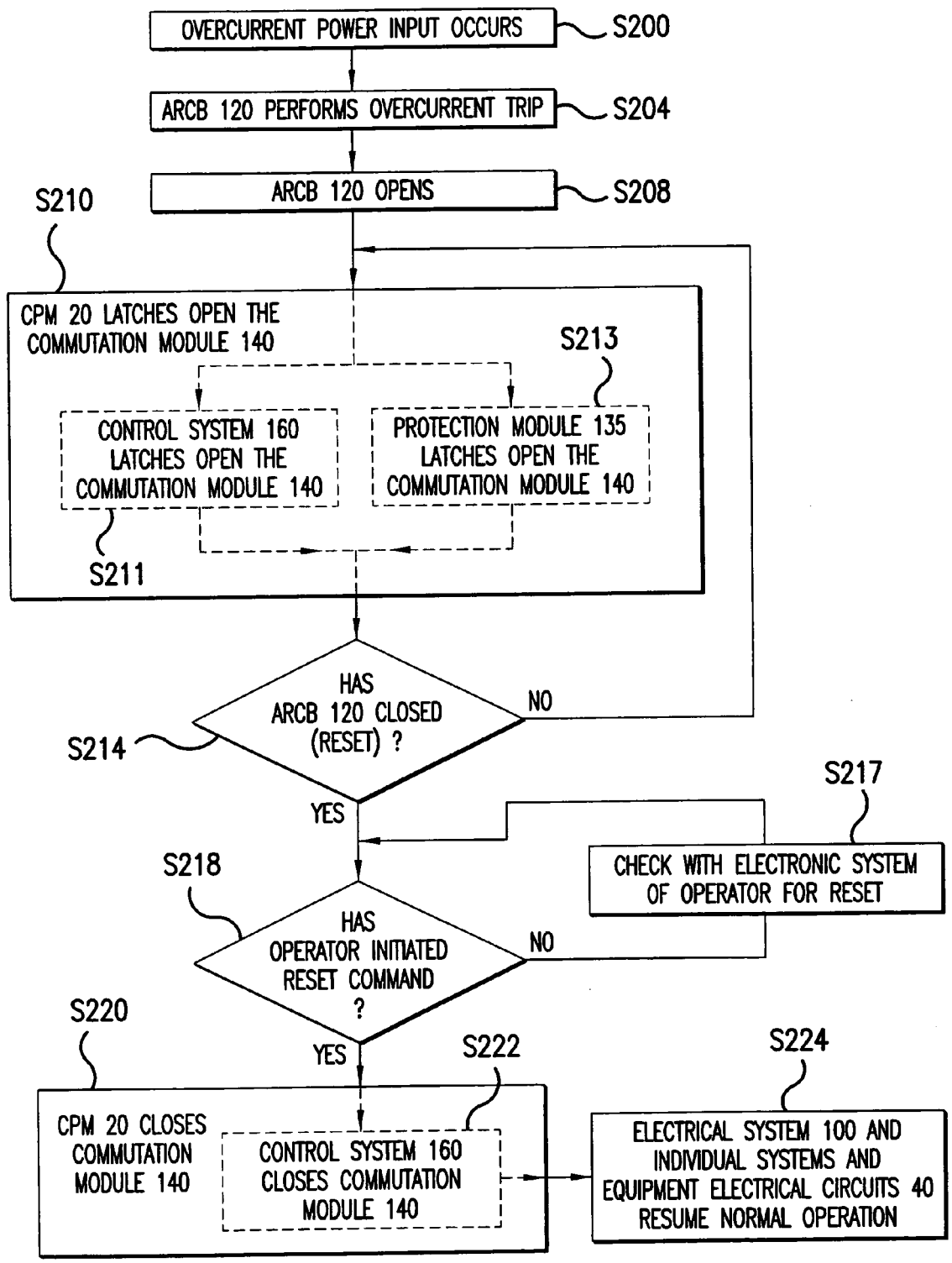
FIG. 6 is a general flow diagram illustrating operations performed by a circuit protection module using an electronically resetable circuit protection arrangement according to an embodiment of the present invention.

FIG. 6 is a general flow diagram illustrating operations performed by a CPM 20 using an electronically resetable circuit protection arrangement according to an embodiment of the present invention. When an over-current condition occurs at the power input to the CPM 20 (S200), the ARCB 120 located on the input of CPM 20 performs the initial overcurrent trip according to the conventional time trip curve in the event of an over-current condition (S204). The ARCB 120 trip opens the circuit (S208), at which point the CPM 20 control algorithms latch open the commutation module 140, inhibiting the current path (S210). Step S210 can be achieved by control system 160 or by protection module 135 (S211, S213). CPM 20 performs a test to determine whether ARCB 120 has closed, which would indicate that the overcurrent condition has disappeared (S214). If ARCB 120 has not closed yet, CPM 20 keeps the commutation module 140 open (S210). When ARCB 120 closes (resets), CPM 20 performs a test to determine if the operator has initiated a reset command (S218). If the operator has not initiated a reset command, CPM 20 checks with the operator's electronic system for reset (S217). The electronic system for reset can be a data bus or a discrete system. A data bus can transmit and decode a digitized message. A discrete system is any connection between the command origin and CPM 20 that can transmit an analog state such as voltage high or low. An example of such a discrete system is a wire connecting an electrical power source or a ground source to CPM 20, through a switch. When the electronic system for reset finally transmits an operator reset command (S218), CPM 20 removes the latch and closes commutation module 140 (S220). Step S220 can be achieved by control system 160 (S222). Electrical system 100 and individual systems and equipment electrical circuits 40 resume normal operation (S224). According to the flow diagram in FIG. 6, control system 160 allows remote functionality and electronic reset. It does not suffer from the numerous performance issues of the SSPC implementation, and achieves significant reduction in complexity and cost.

Figure 7A:
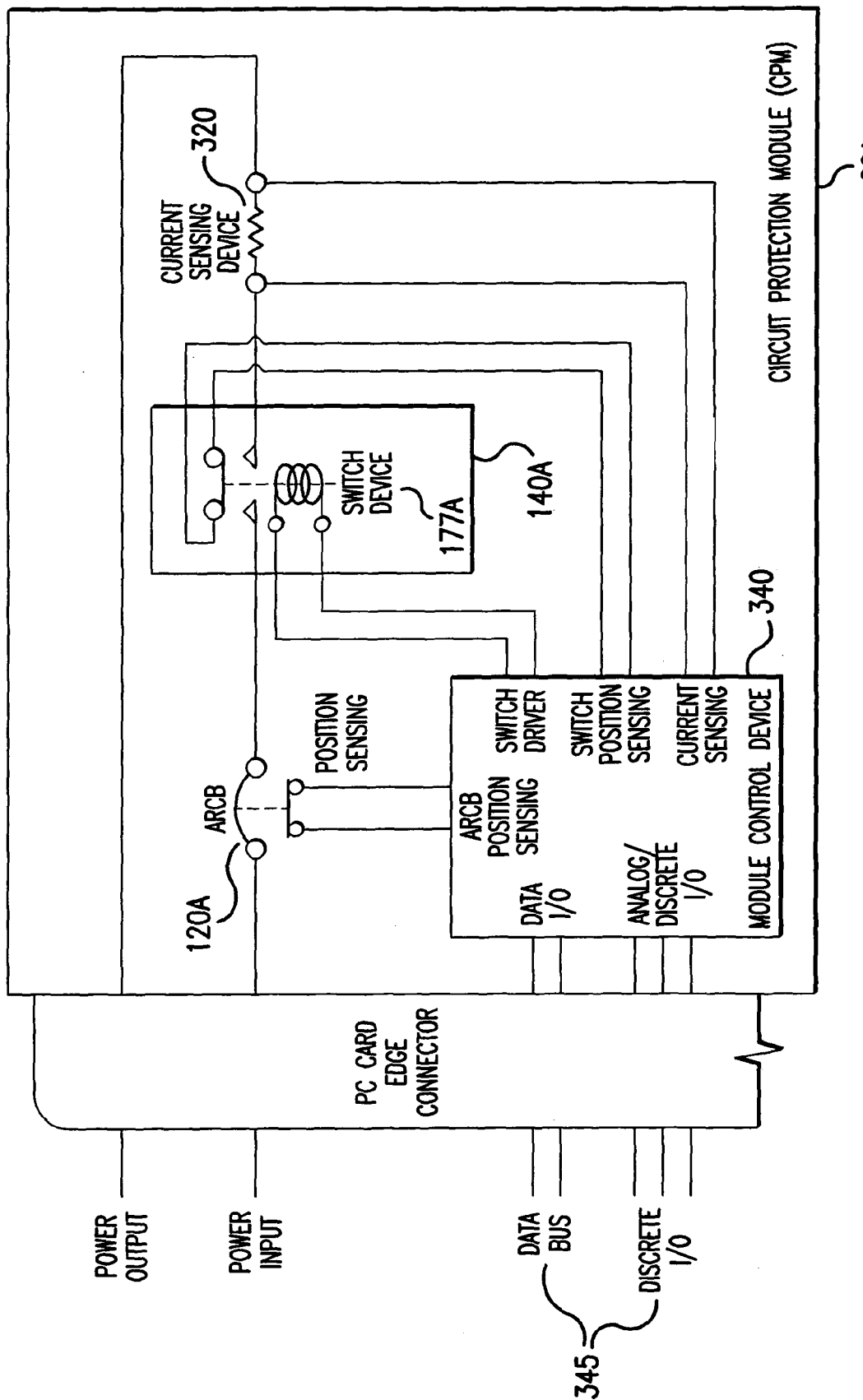
FIG. 7A illustrates a single channel circuit protection system using an electronically resetable circuit protection module arrangement including a switch device in accordance with an embodiment of the present invention.

FIG. 7A illustrates a single channel circuit protection system using an electronically resetable CPM arrangement 20A including a switch device 177A in accordance with an embodiment of the present invention. Commutation module 140A uses a switch device 177A of the type shown in FIG. 5A. Switch device 177A is an electromechanical relay connected in series with ARCB 120A. The CPM 20A arrangement may or may not include a current sensing device 320 that detects amperage as part of a control and reporting loop. The control system of CPM 20A is a Module Control Device 340. The Module Control Device 340 provides protection as it detects the position of the ARCB 120A, reports the status of ARCB 120A, detects the position and amperage of switch device 177A, receives a reset input via data bus or discrete connections 345, and resets the position of switch device 177A. In more sophisticated systems made possible by this architecture, the Module Control Device 340 controls additional load control algorithms, built in test, fault diagnostics, arc fault protection and system status depending on the type of information provided by switch device 177A. If the switch device 177A is not an electromechanical relay but a semiconductor device such as a MOSFET, SCR or TRIAC, the Module Control Device 340 monitors its voltage and amperage. Additional care should be taken in selecting the type of switch device 177A in case the switch device 177A is a semiconductor device. A semiconductor switch device 177A should not create a short when in fail-mode, because a short causes ARCB 120A to repeatedly reset into a faulted condition, thereby making CPM 20A cycle indefinitely.

Figure 7B:
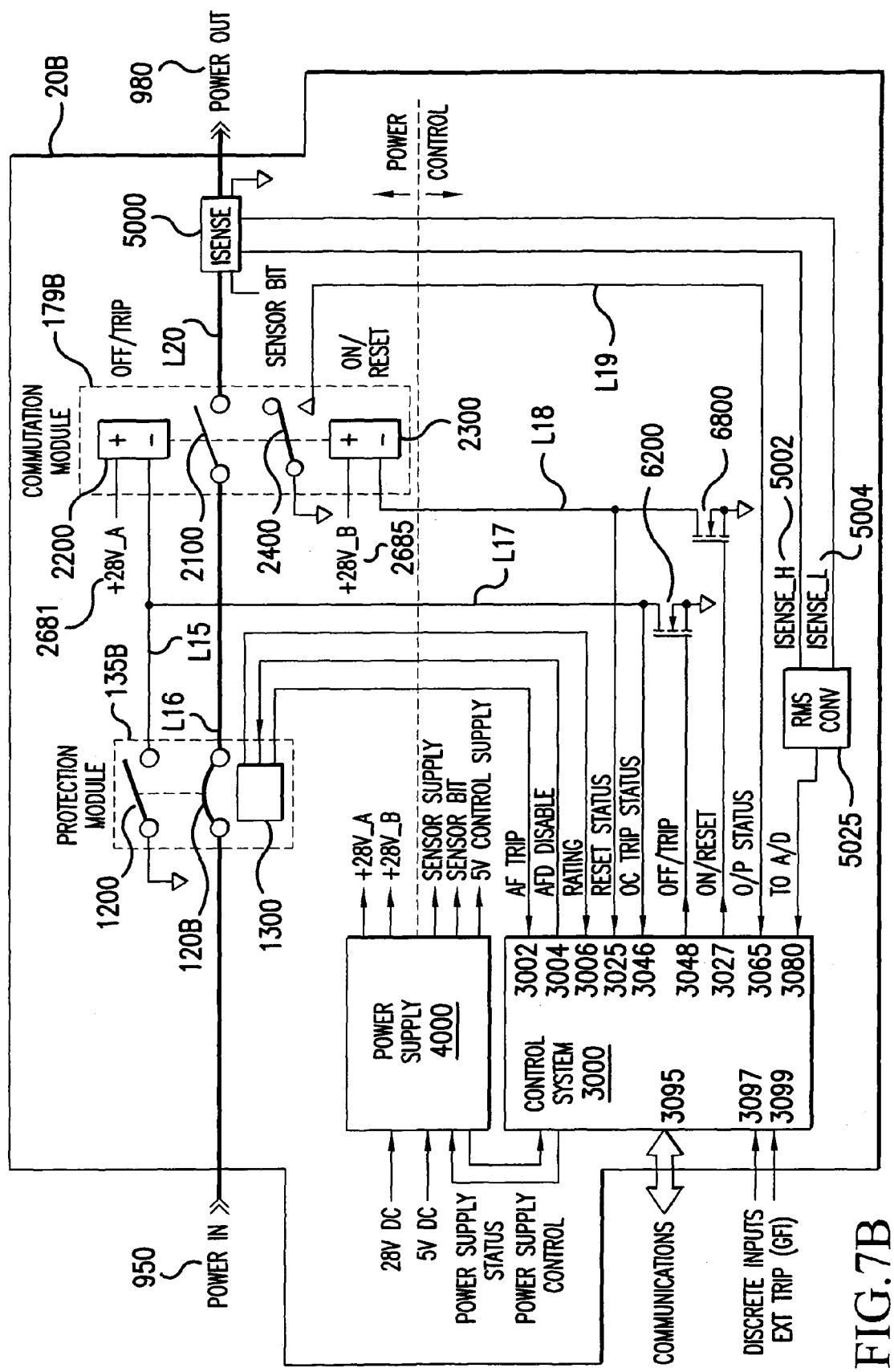
FIG. 7B illustrates a single channel circuit protection system using an electronically resetable circuit protection module arrangement including a commutation device in accordance with an embodiment of the present invention.

FIG. 7B illustrates a single channel circuit protection system using an electronically resetable CPM arrangement 20B including a commutation device 179B in accordance with an embodiment of the present invention. The CPM 20B includes the following components: a protection module 135B; a commutation device 179B; a current sensor 5000; a control system 3000; and a power supply 4000. Electric power from a primary electrical distribution system 10 (from FIG. 1) enters CPM 20B at port 950, passes through protection module 135B, commutation device 179B, and current sensor 5000, and exits CPM 20B at port 980, from where it is sent to circuit systems for additional secondary electrical distribution functions 30 (from FIG. 1).

CPM 20B performs circuit protection, sensing, and reporting, and supports vehicle communications and Built in Test. CPM 20B shown in FIG. 7B, and the corresponding physical layout of the circuit card constructed to this configuration, are arranged to separate the power delivery circuit from the control electronics circuit, to minimize power incompatibilities and EMC characteristics to power distribution which are averse to electronic controls. The architecture in FIG. 7B makes it possible to isolate the two necessary components (power delivery and control electronics) without the use of complex and heavy optocouplers, transformers, or filtering components.

Protection module 135B includes an ARCB 120B and an auxiliary switch 1200. Auxiliary switch 1200 takes its mechanical action from the dissimilar metal heating of the bimetal strip of ARCB 120B. However, auxiliary switch 1200 is designed to operate contrary to the direction of operation of ARCB 120B. Thus, when ARCB 120B closes circuit L16, auxiliary switch 1200 opens circuit L15, and vice versa. Protection module 135B may also include an arc fault detection module 1300. An arc fault detection module is an electronic system currently being developed to include arc fault algorithms and detection electronics within the physical constraints of a conventional circuit breaker, to facilitate the retrofit of hybrid circuit protection on older aircrafts. When such an arc fault detection module with protection algorithm will be commercially available, it can be included in protection module 135B.

Commutation device 179B is a latching relay of the type shown in FIG. 5B and is connected in series with protection module 135B. Commutation device 179B includes the following components: an Off/Trip solenoid 2200; an On/Reset solenoid 2300; a main contact 2100; and a status contact 2400. Off/Trip solenoid 2200 is connected to 28V (2681) and is energized when auxiliary switch 1200 connects to ground and closes circuit L15, or when circuit L17 closes. On/Reset solenoid 2300 is connected to 28V (2685) and is energized when circuit L18 closes. Main contact 2100 is in series with ARCB 120B and closes the main circuit path L20 in CPM 20B. Status contact 2400, which is physically linked to the actuation shaft of main contact 2100 and mimics its operation, closes circuit L19.

Current sensor 5000 is an electric or electronic system that detects the flow of current in the main circuit path L20 of CPM 20B. Based on detected current, current sensor 5000 generates a signal containing information about the high and low values of the sensed current, Isense_H (5002) and Isense_L (5004). The signal is conditioned by an RMS converter 5025 and applied to control system 3000. A preferred embodiment for current sensor 5000 is a Hall Effect device that maintains current control and senses isolation when no current is present. Other embodiments for current sensor 5000 are a transformer for sensing of AC currents, and a shunt resistor for sensing of DC currents. Transformers and shunt resistors can be used as control sensors 5000 if their reduced performance and current isolation capabilities are tolerable in the application for which CPM 20B is used.

Control system 3000 is an electric or electronic system that coordinates the operation of CPM 20B. Control system 3000 receives reset status information from On/Reset solenoid 2300 at reset status sensor 3025; trip status information from Off/Trip solenoid 2200 at OC trip status sensor 3046; information from status contact 2400 at O/P status sensor 3065; current information from current sensor 5000 through RMS converter 5025, at sensor 3080; and arc fault trip status and rating information from arc fault detection module 1300, at AF trip status sensor 3002 and Rating sensor 3006. Control system 3000 also controls the status of Off/Trip solenoid 2200, from OFF/trip control 3048 through driver 6200; the status of On/Reset solenoid 2300, from ON/reset control 3027 through driver 6800; and the status of arc fault detection module 1300, from AFD Disable control 3004. Control system 3000 interfaces with the higher-level data and power systems onboard the vehicle. Control system 3000 exchanges communications with human operators and components of electrical system 100 through communication pathway 3095. Control system 3000 also receives commands from human operators and components of electrical system 100 at discrete inputs pathway 3097 and manual external trip input EXT trip (GFI) pathway 3099.

Power supply 4000 is an electric system that inputs AC and DC electric power and outputs supply power to components of CPM 20B. Power supply 4000 supplies the 28V voltages 2681 and 2685 that energize Off/Trip solenoid 2200 and On/Reset solenoid 2300; a current sensor bit and current sensor supply for the functioning of current sensor 5000; and a 5V control supply for control system 3000. Control system 3000 receives information about the status of power supply 4000, and controls power supply 4000 accordingly.

The use of a latching relay 179B in FIG. 7B in place of an electrically held solenoid relay improves on the implementation of the hybrid electronic reset circuit breaker in primarily two areas. Firstly, the latching relay function requires having electrical power applied only when a change of state is required. Thus there is no continuous power dissipation in the normally on or off states of a latching relay. Since the power required to change latching relay state is insignificant against the total time between state changes, the power dissipation from the latching relay coil is trivial and does not contribute appreciably to the total power dissipation of the integrated secondary power distribution system. Secondly, the latching relay 179B function, when coupled with an extension of the ARCB 120B design, renders the entire circuit protection function independent and autonomous from the electronic reset or any other electronic operations or logical computations. This further reduces cost through reduction of parts count and reduction of design assurance levels since the circuit protection function is clearly deterministic. Reset is still accomplished through the electronic communications and reset driver commanded digitally from the vehicle operator, but simple discrete wiring controls can also be added to bypass the digital bus reset command route, if so desired.

Further benefits of the circuit in FIG. 7B are that the overload protection circuit remains functional even in the event of a power failure or malfunction in the electronic controls. Also, unlike an electronically controlled system, the latching relay and the circuit power flow remains in the last commanded position between power up settings. This is useful for equipment that is required to be operational at all times, such as a fire protection system, since the circuit protection module can be connected to a battery bus that is powered irrespective of the vehicle battery master switch position. Another benefit is that during power interruptions, the circuit power path will not cycle off and on, or remain off and require a re-closure command from the operator.

Figure 8:
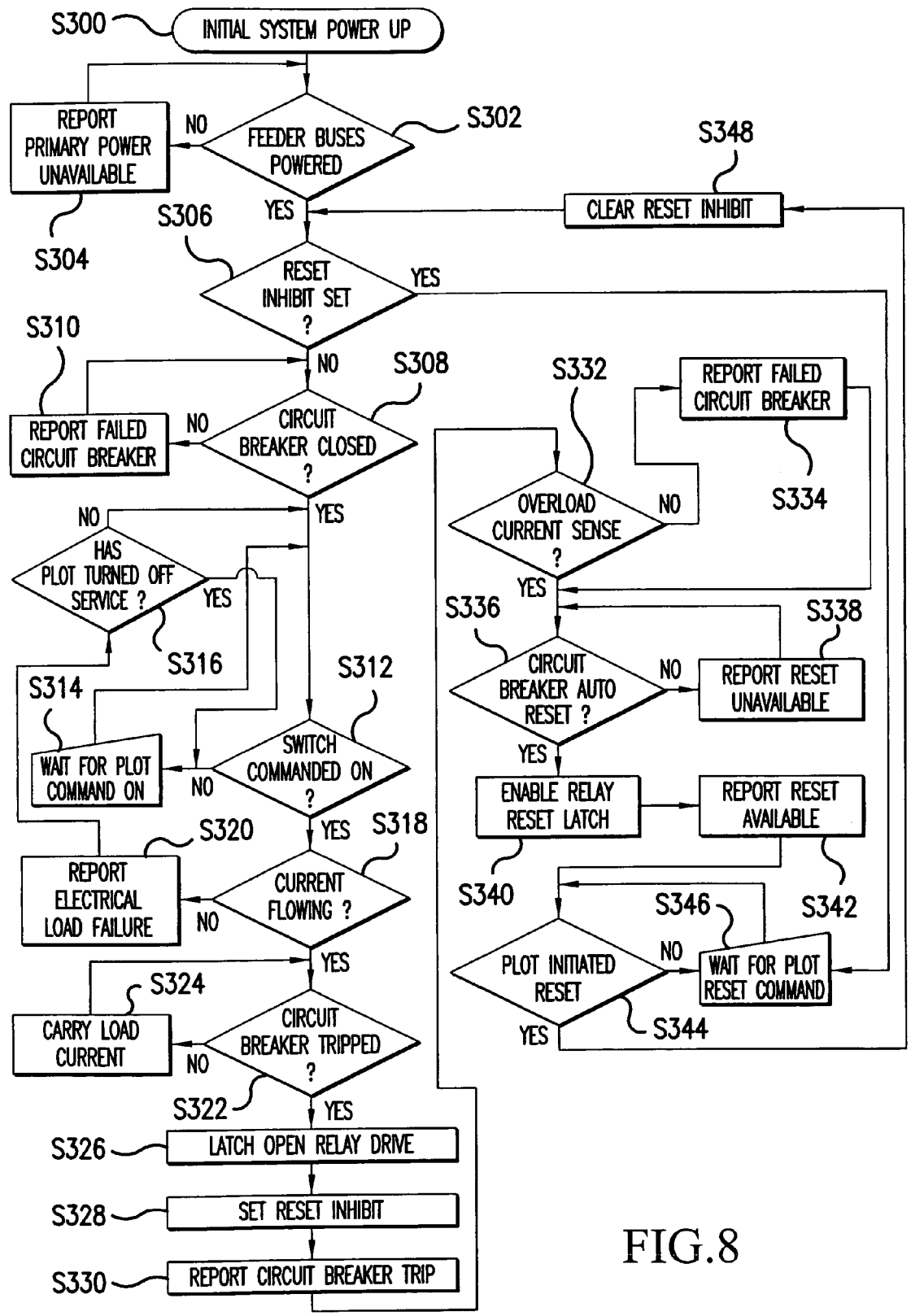
FIG. 8 illustrates an exemplary logic flow for use with a single channel circuit protection system using an electronically resetable circuit protection module arrangement including a switch device in accordance with an embodiment of the present invention illustrated in FIG. 7A.

FIG. 8 illustrates an exemplary logic flow for use with a single channel circuit protection system using an electronically resetable CPM arrangement 20A including a switch device in accordance with an embodiment of the present invention illustrated in FIG. 7A. The main steps of the logic flow diagram are: check for power on feeder busses which provide electrical energy to ISPS 50 (S302, S304); check for previous reset inhibit condition of switch device 177A (S306); check for closed/failed state of ARCB 120A (S310, S308); check for switch device 177A on/off state (S312, S314, S316); check for flow of current through switch device 177A (S318, S320); check for open (tripped) state of ARCB 120A (S322, S324); latch open and inhibit switch device 177A and report ARCB 120A trip (S326, S328, S330); check for overload current through switch device 177A (S332, S334); check for ARCB 120A auto-reset (S336, S338); and check for reset of switch device 177A by operator (S344, S346) for return of circuit to normal. From the flow chart, it can be seen that the logical controls can be reduced to simple machine states because no circuit breaker functions need to be artificially generated, as is typically the case with SSPC devices. This system has reduced complexity and redundancy. It also has a high design assurance level allowing lower weight and cost and higher reliability, while providing the required functionality.

Figure 9:
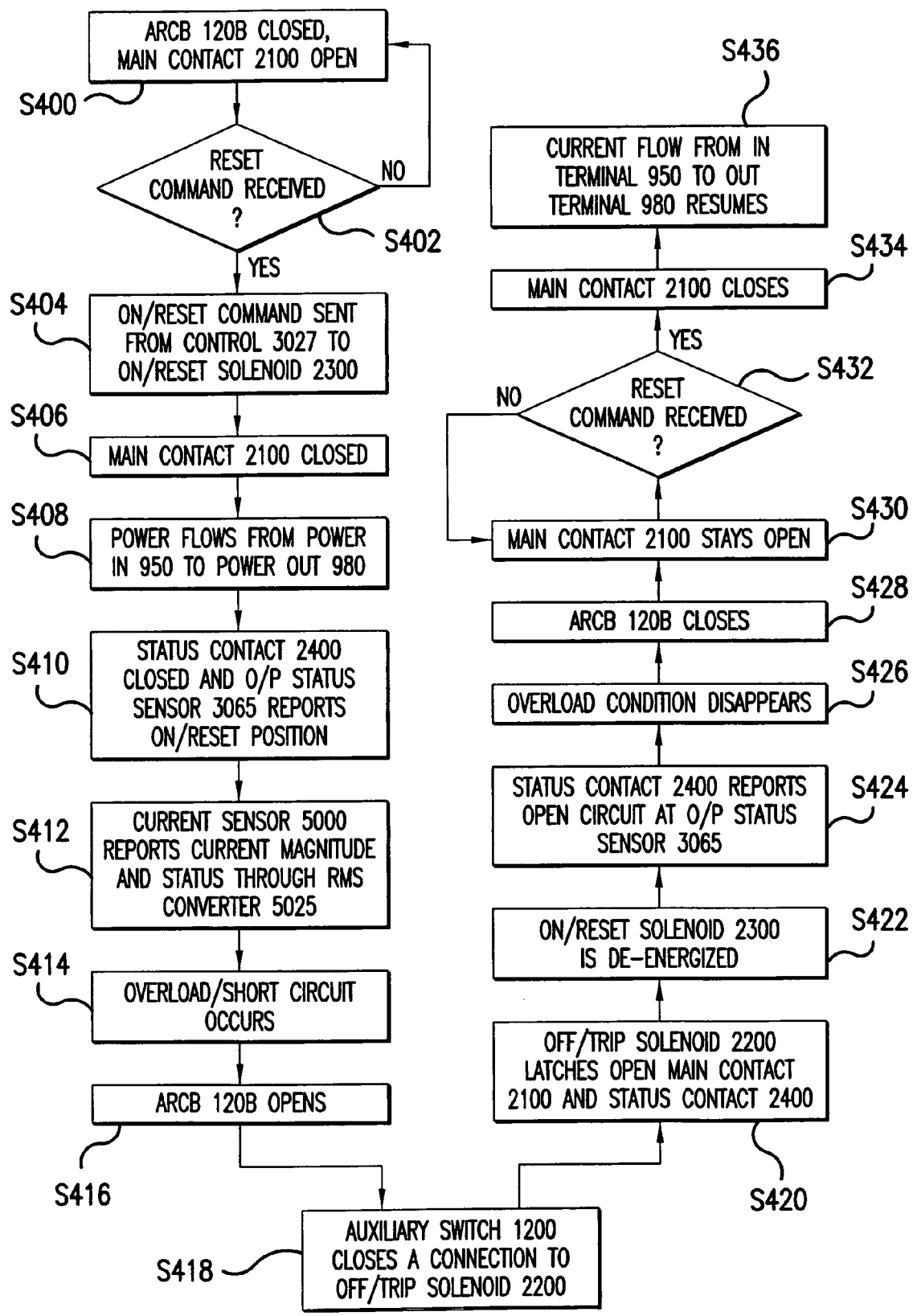
FIG. 9 illustrates an exemplary logic flow for use with a single channel circuit protection system using an electronically resetable circuit protection module arrangement including a commutation device in accordance with an embodiment of the present invention illustrated in FIG. 7B.

FIG. 9 illustrates an exemplary logic flow for use with a single channel circuit protection system using an electronically resetable CPM arrangement 20B including a commutation device 179B in accordance with an embodiment of the present invention illustrated in FIG. 7B. Normally ARCB 120B is in the closed state shown in FIG. 7B, and the main contact 2100 is in its last commanded position (shown open in FIG. 7B) (S400). This is the initial state whereby CPM 20B is ready but not yet switched on by the operator. Assuming that the aircraft power buses have been powered up and applied to power supply 4000, and power is applied to the necessary electronics of control system 3000, CPM 20B stands ready to accept commands from the higher level communications bus 3095, discrete inputs 3097 and manual external trip input 3099.

Upon receipt of a reset command from the higher level communications bus 3095, discrete inputs 3097 or manual external trip input 3099 (S402), control system 3000 sends an On/Reset command from control 3027 to the On/Reset solenoid 2300 of commutation device 179B via the driver 6800 (S404). This momentary power application causes the On/Reset solenoid 2300 to toggle the main contact 2100 to the closed position (S406) and allows power to flow from power-in port 950 to power-out port 980, and subsequently on to the electrical services connected to the power-out 980 (S408). Since status contact 2400 is physically linked to the actuation shaft of the main contact 2100 in commutation device 179B, On/Reset solenoid 2300 also closes the status contact 2400 (S410). Closing of status contact 2400 provides a feedback signal to control system 3000 at O/P status sensor 3065 that commutation device 179B is now in the On/Reset position (S410). In this mode, the current sensor 5000 detects the flow of current and sends a signal that is conditioned by RMS converter 5025 and applied to control system 3000 at sensor 3080 (S412). This confirms that the main CPM 20B circuit has been closed. The signal from RMS converter 5025 also provides a current magnitude (S412) that can be transmitted by control system 3000 back to higher level utility systems through communications pathway 3095, for control purposes or vehicle status display to the operator.

In the event that an overload or short circuit occurs down stream of the power-out terminal 980 (S414), the ARCB 120B included in protection module 135B will automatically and autonomously open the main circuit path L16 by dissimilar metal deformation of the ARCB 120B bimetal strip (S416). This stops the flow of power to power-out terminal 980 and to the load. Following ARCB 120B deformation, auxiliary switch 1200 from protection module 135B closes a connection to the Off/Trip solenoid 2200 (S418). Off/Trip solenoid 2200 reports OC trip status at sensor 3046 and On/Reset solenoid 2300 is de-energized from control 3027 (S422). Off/Trip solenoid 2200 actuates the commutation device 179B, main contact 2100, and status contact 2400 to the open position and latches them in that position (S420). Status contact 2400 reports circuit open at O/P status sensor 3065 (S424). Upon removal of the overload current condition (S426), the downstream wiring circuit is protected. The absence of overload current allows ARCB 120B to cool and spring back into its normally closed position (S428), while commutation device 179B stays latched in the open position (S430). Only upon receipt of a reset command from the higher level communications bus 3095, discrete inputs 3097, or manual external trip input 3099 (S432), the control system 3000 sends an On/Reset command energizing the On/Reset solenoid 2300, which closes main contact 2100 (S434) and resumes current flow in CPM 20B from power-in terminal 950 to power-out terminal 980 (S436).

Further to the primary function of protecting wire and equipment from downstream electrical faults and overloads, the circuit of FIG. 7B allows for the normal switching control of power to the load through the opening and closing of the commutation device 179B. During this normal mode of operation, the protection module 135B is considered to be carrying its rated current and is therefore in the closed position. Control system 3000 is in constant contact with the higher-level vehicle data bus communications 3095 and with the discrete wiring connections to service controls at ports 3097 and 3099. In the event that a command is received through either communication method (3095, 3097 or 3099), control system 3000 would process that command request and activate either the On/Reset solenoid 2300 or the Off/Trip solenoid 2200 to put the commutation device 179B in the requested state. Position feedback is obtained by control system 3000 from the status contact 2400 of the commutation device 179B. The communications input to the control system 3000 at ports 3095, 3097 or 3099 is termed a request since control system 3000 needs to evaluate the protection status of CPM 20B and not override a tripped commutation device 179B, unless the commutation device 179B has been first reset by vehicle operator input. Further to this function is the need to design the latching relay Off/Trip and On/Reset solenoids 2200 and 2300 in a manner that allows the Off/Trip solenoid 2200 to be able to overpower the On/Reset solenoid 2300. Such design could be accomplished with more solenoid coil turns or differing solenoid magnetic materials as appropriate to adjust the solenoid pull in strength. This design feature would ensure that protection of main current path L20 of CPM 20B could always be activated and commutation device 179B held in the trip position, in the event that a failure might continually energize the On/Reset position.

Figure 10:
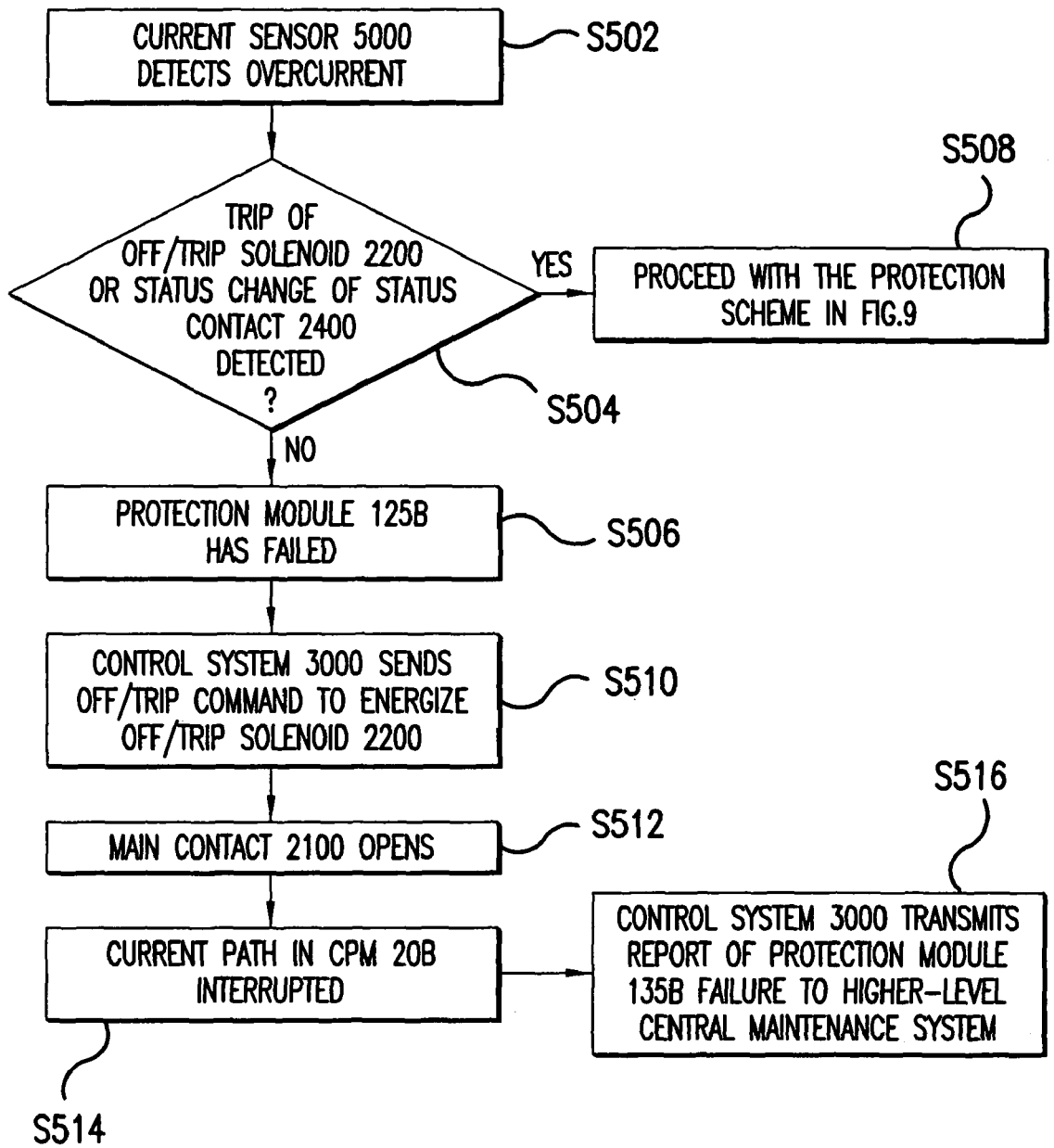
FIG. 10 illustrates a logic flow for use in case of protection module failure in a single channel circuit protection system using an electronically resetable circuit protection module arrangement including a commutation device in accordance with an embodiment of the present invention illustrated in FIG. 7B.

FIG. 10 illustrates a logic flow for use in case of protection module 135B failure in a single channel circuit protection system using an electronically resetable CPM 20B arrangement including a commutation device 179B in accordance with an embodiment of the present invention illustrated in FIG. 7B. While the overcurrent protection scheme described in FIG. 9 is the normal means of operation of CPM 20B and places the least amount of stress on the commutation device 179B, it is possible to provide a redundant protection means through the use of current sensor 5000, RMS converter 5025, and control system 3000. In the event that the current sensor 5000 detects an overcurrent (S502) and that condition is conveyed to control system 3000 but the control electronics do not detect a corresponding trip of the Off/Trip solenoid 2200 or a status change of status contact 2400 (S504), this would indicate a failure of the protection module 135B (S506). After a predetermined time delay to establish a valid protection module failure, control system 3000 can send an Off/Trip command from control 3048 via the driver 6200, to energize Off/Trip solenoid 2200 (S510). Off/Trip solenoid 2200 opens main contact 2100 (S512) and discontinues the current path in CPM 20B to the downstream wire and equipment (S514). Furthermore, control system 3000 detects the failure of protection module 135B and can transmit a failure report to the higher-level central maintenance system via communication bus 3095 for later corrective action (S516). By incorporating a passive primary trip means (as in FIG. 9) and an active secondary trip means (as in FIG. 10), the reliability of the circuit protection function of CPM 20B is greatly improved.

Figure 11:
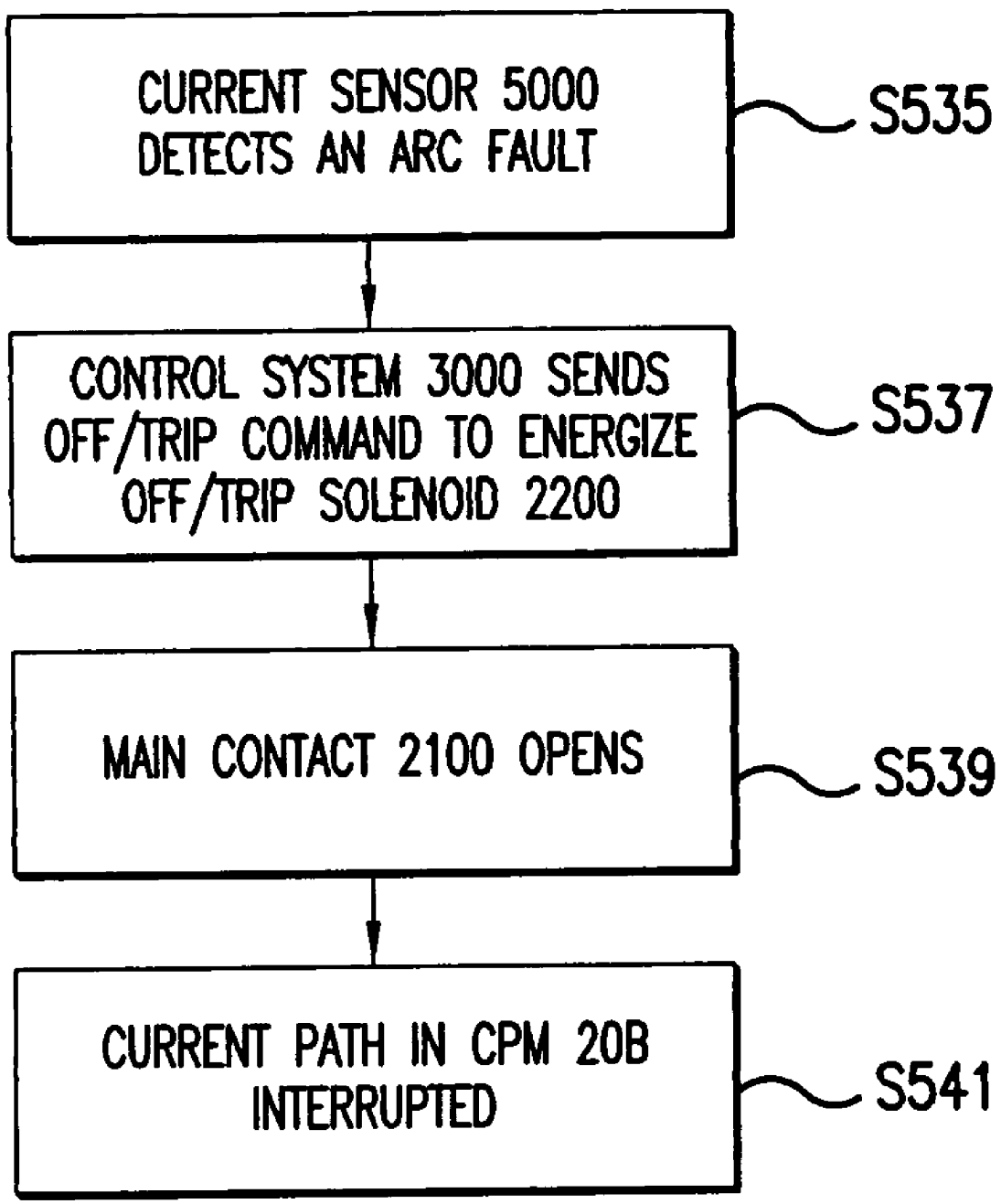
FIG. 11 illustrates a logic flow for use in Arc Fault detection in a single channel circuit protection system using an electronically resetable circuit protection module arrangement including a commutation device in accordance with an embodiment of the present invention illustrated in FIG. 7B.

FIG. 11 illustrates a logic flow for use in Arc Fault detection in a single channel circuit protection system using an electronically resetable CPM 20B arrangement including a commutation device 179B in accordance with an embodiment of the present invention illustrated in FIG. 7B. In the event that Arc Fault Detection is required in the higher-level aircraft specifications, the circuit in FIG. 7B takes advantage of its implementation thorough two possible methods.

Arc Fault is the leakage of electrical current to ground resulting from wire insulation damage and subsequent carbon tracking of electrical current to a ground potential. Such leakage is a substantial threat, but it exhibits a too brief or too low current flow to trip conventional circuit breakers. The Arc Fault current can produce wire degradation and heating effects that can pass unnoticed and can lead to wire burning and a fire hazard. Since the arc fault signatures are unique and transparent to a circuit breaker such as ARCB 120B, electronic detection means are required to catch the Arc Fault occurrence and to activate protective action.

To implement Arc Fault protection in CPM 20B, the arc fault detection algorithm can be exercised in the control system 3000. If an Arc Fault is detected via the current sensor 5000 (S535), the control system 3000 can trip off the commutation device 179B by sending an OFF/Trip command from control 3048 (S537), and energize the Off/Trip solenoid 2200 (S537). Main contact 2100 opens (S539) and the current path in CPM 20B is interrupted (S541).

A second alternative means of incorporating the Arc Fault detection algorithm is by obtaining that algorithm as part of the protection module 135B design. The arc fault detection could be included in an arc fault detection module 1300 as part of the protection module 135B. Electronic arc fault detection systems are currently being developed to include arc fault algorithms and detection electronics within the physical constraints of a conventional circuit breaker to facilitate the retrofit of hybrid circuit protection on older aircrafts.

Figure 12A:
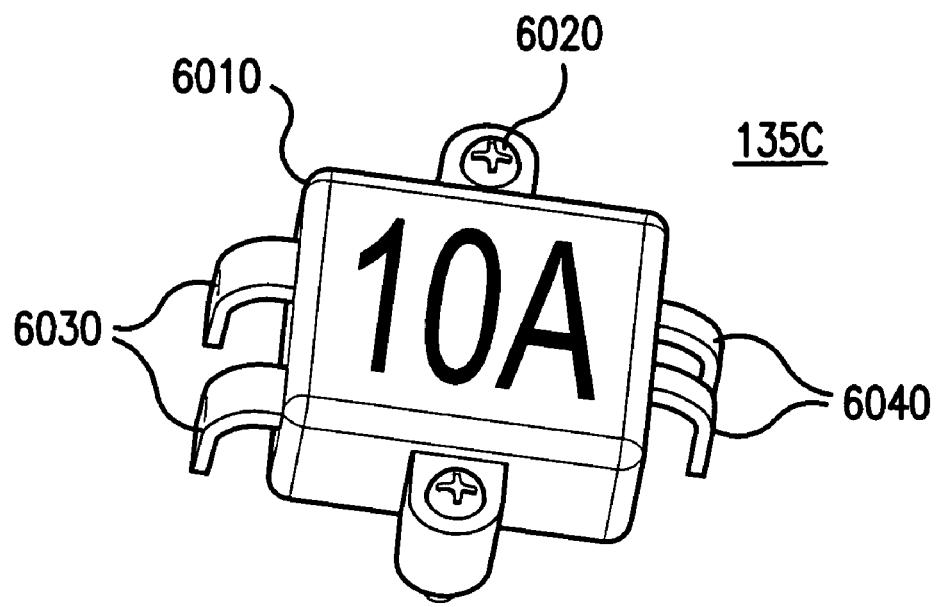
FIG. 12A-FIG. 12B illustrate an exemplary implementation of a protection module for use in a circuit protection module with electronically resetable circuit protection according to an embodiment of the present invention illustrated in FIG. 2.
Figure 12B:
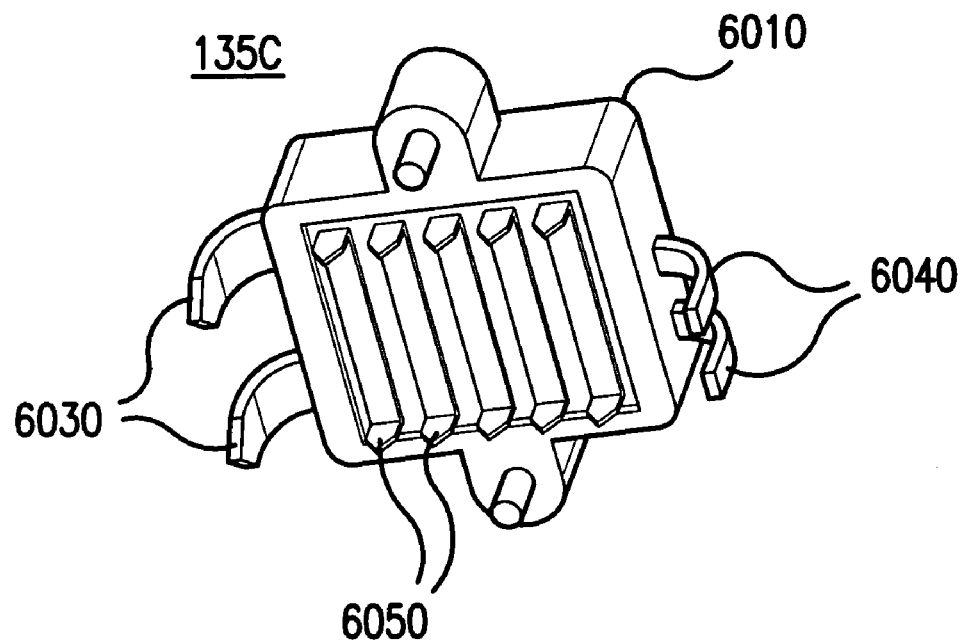

FIG. 12A-FIG. 12B illustrate an exemplary implementation of a protection module 135C for use in a CPM 20 with electronically resetable circuit protection according to an embodiment of the present invention illustrated in FIG. 2. A protection module 135 included in a CPM 20 requires selection of an appropriate ARCB 120, and physical insertion into the particular protection channel desired. The implementation of protection module 135C shown in FIG. 12A-FIG. 12B provides for quick installation of the correct size ARCB 120. The implementation of protection module 135C shown in FIG. 12A-FIG. 12B also simplifies the number of circuit card part numbers that need to be designed and manufactured. The protection module 135C also provides for a means to check the installed ARCB 120 configuration and nominal values against the master configuration record. The master configuration record pertains to the particular CPM 20 channel the ARCB 120 is installed in. The check against the master configuration record is executed in a higher-level controller to ensure, prior to system use, that the proper ARCB 120 is being applied. Check of the ARCB 120 configuration and nominal values against the master configuration record eliminates possible installation errors in the circuit card build-up process.

The type of plug illustrated in FIG. 12A-FIG. 12B is used as protection module in a circuit protection module arrangement CPM 20 in place of a permanently inserted and soldered automatic circuit breaker. The illustrated plug improves on the implementation of the hybrid electronic reset circuit breaker in primarily two areas.

Firstly, it allows a common circuit card to be designed and manufactured with sufficient capacity to carry a range of nominal current values expected in a particular application. The primary concern is to be able to configure the protection rating at initial build since the circuit protection value for a particular CPM 20 channel is sized according to the wire and service to which CPM 20 output is connected on the vehicle. On an aircraft, the systems that CPM 20 is connected to and protects are relatively permanent. Hence, the required protection value for ARCB 120 is not practically expected to change over the lifetime of the vehicle for a particular service. This means that once the correct protection module 135C card has been installed, no further changes are needed in ARCB parts. Therefore the ease of initial manufacture of the protection module 135C card holding the ARCB 120, and the ease of possible shop assembly of new cards for replacement of a failed card, are most important.

Secondly, the protection module 135C described in FIG. 12A-FIG. 12B incorporates programming pins that, when plugged into their receptacles on the circuit card, would indicate to the control electronics the rating of the protection module 135C that has been installed.

The pictorial concept of protection module 135C shows two views: a top view of protection module 135C in FIG. 12A, and a bottom view in FIG. 12B. Protection module 135C consists of a casing 6010 that holds the internal workings of the ARCB 120. Screws 6020 of casing 6010 provide physical restraint to the ARCB 120 when it is inserted into position on the board. The protection module 135C is intended to be inserted into a suitably designed mating socket typical to the industry used to semi-permanently mount the protection module 135C and other module devices onto circuit cards. The method of affixing the protection module 135C to the circuit card could alternately be realized through other means such as plastic or metal clips to "snap' the device into place on the socket. For permanent installation, the protection module 135C could be directly soldered to the printed circuit card, although the preferred method is to "socket" the protection module 135C to provide easy assembly and disassembly. Indelibly scribed on the surface of the protection module 135C is the component rating to be used by the installer as identification of the component rating.

The protection module 135C outputs consist of power pins 6030, auxiliary pins 6040, and configuration pins 6050. Other pins can be incorporated to provide additional information as required by higher-level system. One such additional connection (not shown) would be a pin to indicate the arc fault status, in the case an arc fault detection module 1300 (as in FIG. 7B) is included in the protection module 135C. The power pins 6050 are used to carry the power lines into the protection module 135C, through the ARCB 120 contacts, and then back out to the circuit card of CPM 20. Similarly, the auxiliary pins 6040 connect a loop closure connection from the circuit card to the auxiliary contacts 1200 (as in FIG. 7B), then back to the CPM 20 circuit card, for use in tripping the OFF/Trip solenoid 2200 of the latching relay 179B downstream in the channel.

The configuration pins 6050 provide a physical attribute assigned during the manufacturing process that corresponds to the rating of the module and the value scribed on the surface of the casing 6010. Quality control procedures during the manufacture of the protection module 135C would ensure that the number and arrangement of configuration pins on the bottom of the protection module 135C will accurately identify the rating of the protection module 135C and the marking on the face of the module. A possible 10 amps rating with all five-configuration jumpers installed is shown in FIG. 12A. For different ratings, such a 7.5 amps rating, 7.5 amps would be marked on the casing 6010 and perhaps only 4 jumpers would be installed. This type of marking would be incorporated to provide the necessary indication of the various protection ratings. This method of implementing the rating information is the preferred method due to its low cost, low weight, simplicity of implementation and high reliability. Other methods, such as bar code marking, other optical methods, or magnetic detection methods, may become applicable and feasible. Currently however, these other methods are prohibitive.

To utilize the protection module 135C design, an assembly technician or automated insertion machine would assemble the integrated secondary power distribution system cards according to a master configuration file for the panel being constructed. For each channel of a common protection circuit card, the appropriately identified protection module 135C would be inserted. When the integrated secondary power distribution panel is fully populated, automated test equipment interrogates the local control electronics on the circuit card to determine the actual protection module 135C inserted, via its measurement of the configuration pins on each protection module. When eventually installed in the vehicle, the central maintenance computer or other higher-level controller could interrogate the installed hardware to ensure that the configuration file for the vehicle is respected. In the event that a mismatch is detected at any level of the interrogation, the respective circuit card would be marked for inspection and corrective action. Higher-level actions may involve disabling the circuit exhibiting the mismatch, prior to corrective action.

In the event that a failure of the hybrid electrically resetable circuit protection circuit card occurs in service, the vehicle central maintenance computer would identify a particular card for replacement. The maintenance technician would then select a common circuit card from his available stores. Using the configuration data for that card, the maintenance technician would insert the appropriate protection module ratings into their respective locations by affixing them to the card using the provisions provided. Upon gaining access to the vehicle, the technician would replace the card and run a diagnostic where the central maintenance computer of the vehicle would check that the configuration data is correct.

Individual components of an embodiment of the invention exist as high confidence level "commercial off-the-shelf" devices. An embodiment of the invention provides a novel technique for connecting available devices to provide a hybrid system for electronically resetable circuit protection. An implementation of the present invention may modify the packaging of the individual devices to better suit the PC board module construction while retaining the particular arrangement and mechanics that provide the original advantages. In another implementation of the present invention, individually packaged conventional elements may be integrated into a combination of elements within a single package that offers advantages in weight, volume, cost or manufacturing process.

We claim:

1. An electrical circuit protection system providing a circuit protection in an electrical power distribution system, said electrical circuit protection system comprising:
    an automatic reset circuit breaker for protecting against overcurrent having at least one contact directly attached to a bi-metallic member;
    the bi-metallic member being in a protected current path through the circuit breaker and configured to snap the at least one directly attached contact into an open position in the event of an overcurrent condition in the bi-metallic member;
    wherein the bi-metallic member restores the at least one directly attached contact into a closed position when the overcurrent condition in the bi-metallic member is no longer present and maintains the at least one directly attached contact in a closed position in an absence of an overcurrent condition;
    a commutation module electrically connected to said automatic reset circuit breaker;
    a controller that sets a state of said commutation module based on:
        detected state of said automatic reset circuit breaker; and
        externally input commands;
    wherein said commutation module is a latching relay; and
    wherein said latching relay includes an OFF/trip solenoid, an ON/reset solenoid, a main contact and a status contact, said status contact being physically linked to said main contact to mimic operation of said main contact.

2. The electrical circuit protection system providing a circuit protection in an electrical power distribution system as recited in claim 1, further comprising:
    an auxiliary switch connected to said automatic reset circuit breaker and designed to operate contrary to the direction of operation of said automatic reset circuit breaker; and
    an electrical connection between said auxiliary switch and said OFF/trip solenoid which energizes said OFF/trip solenoid when said auxiliary switch closes.

3. The electrical circuit protection system providing a circuit protection in an electrical power distribution system as recited in claim 1, said controller further comprising:
    an OFF/trip control and a status sensor for said OFF/trip solenoid, said OFF/trip control controlling the state of said OFF/trip solenoid; an ON/reset control and a status sensor for said ON/reset solenoid, said ON/reset control controlling the state of said ON/reset solenoid; and a status sensor for said status contact.

4. An electrical circuit protection module providing circuit protection in an electrical power distribution system the module comprising:
    an automatic reset circuit breaker that autonomously produces a first interruption a current path in presence of an overcurrent condition in the current path;
    the first interruption being produced by a first movement of a movable contact directly attached to a bi-metallic member;
    the first movement resulting from current passing through the bi-metallic member and resulting in the movable contact being separated from a fixed contact;
    a commutation module electrically connected to said automatic reset circuit breaker;
    the commutation module being in series with the current path;
    wherein the commutation module produces a second interruption of the current path responsively to the first interruption;
    the first interruption being eliminated by a second movement of the movable contact directly attached to the bi-metallic member after production of the second interruption of the current path;
    the second movement resulting from an absence of current in the bi-metallic member and resulting in the movable contact being engaged with the fixed contact; and
    the commutation module being resettable to close the second interruption responsively to electrical commands generated externally from the electrical circuit protection module.

5. The electrical circuit protection module as recited in claim 4, wherein said commutation module is an electromechanical relay.

6. The electrical circuit protection module as recited in claim 4, wherein said commutation module is a semiconductor device.

7. The electrical circuit protection module as recited in claim 6, wherein said semiconductor device is a MOSFET, a TRIAC, or an SCR.

8. The electrical circuit protection module as recited in claim 4, wherein said automatic reset circuit breaker is not manually, electronically, or remotely controlled.

9. The electrical circuit protection module as recited in claim 4, wherein said automatic reset circuit breaker is not latched.

10. The electrical circuit protection module as recited in claim 4, wherein said commutation module is a latching relay.

11. The electrical circuit protection module as recited in claim 10, wherein said latching relay includes an OFF/trip solenoid, an ON/reset solenoid, a main contact and a status contact, said status contact being physically linked to said main contact to mimic operation of said main contact.

12. The electrical circuit protection module as recited in claim 4, wherein said commutation module is implemented as a device that holds said automatic reset circuit breaker, electrically connects said automatic reset circuit breaker through pins, and contains configuration pins and markings that describe the rating of said automatic reset circuit breaker.

13. A method of providing circuit protection in an electrical power distribution system, said method comprising:

opening contacts, at least one of the opening contacts directly attached to a bi-metallic member, by snapping the bi-metallic member into a contact-opening opening position in the event of an overcurrent condition in a protected current path that passes through the bi-metallic member to produce a first interruption in the current path;

producing a second interruption in the current path responsively to an occurrence of the first interruption with a commutation module incorporated in the protection module so that current through the bi-metallic member is interrupted;

allowing the bi-metallic member to assume a closed-contact configuration so that the at least one contact directly attached to the bi-metallic member is restored to a closed-contact position and so that the first circuit interruption is eliminated; and controlling flow of current through said protection module with the commutation module in response to commands produced externally of the protection module.

* * * * *